United States Patent
Yu

(10) Patent No.: US 9,919,242 B2
(45) Date of Patent: Mar. 20, 2018

(54) WATER-VAPOR SEPARATION BOX FOR INSTANT-HOT TYPE WATER DISPENSER

(71) Applicant: Xiamen Runner Industrial Corporation, Xiamen (CN)

(72) Inventor: Guo-qiang Yu, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 274 days.

(21) Appl. No.: 15/051,536

(22) Filed: Feb. 23, 2016

(65) Prior Publication Data
US 2016/0256797 A1 Sep. 8, 2016

(30) Foreign Application Priority Data

Mar. 6, 2015 (CN) .................... 2015 2 0128483 U

(51) Int. Cl.

| | |
|---|---|
| B01D 45/08 | (2006.01) |
| B01D 19/00 | (2006.01) |
| B01D 45/16 | (2006.01) |
| G01L 19/06 | (2006.01) |
| B01D 50/00 | (2006.01) |
| F02M 37/00 | (2006.01) |
| F02D 33/00 | (2006.01) |
| B04C 3/04 | (2006.01) |

(52) U.S. Cl.
CPC ......... *B01D 19/0042* (2013.01); *B01D 45/08* (2013.01); *B01D 45/16* (2013.01); *B01D 50/002* (2013.01); *B04C 3/04* (2013.01); *F02D 33/003* (2013.01); *F02M 37/0082* (2013.01); *G01L 19/0654* (2013.01); *Y10S 55/14* (2013.01); *Y10S 55/19* (2013.01)

(58) Field of Classification Search
CPC .. B01D 19/0042; B01D 45/16; B01D 50/002; B01D 45/08; B01D 45/12; F02M 37/0082; G01L 19/0654; F02D 33/003; Y10S 55/19; Y10S 55/14; B04C 3/04
See application file for complete search history.

(56) References Cited

U.S. PATENT DOCUMENTS

| | | | | |
|---|---|---|---|---|
| 2,866,519 A | * | 12/1958 | Engman ................. | B01D 45/08 55/485 |
| 4,234,328 A | * | 11/1980 | Hudson, Jr. ............ | B01D 45/12 55/319 |
| 4,333,835 A | * | 6/1982 | Lynch .................... | B01D 17/00 210/305 |
| 4,627,406 A | * | 12/1986 | Namiki .................. | F01M 13/04 123/572 |

(Continued)

*Primary Examiner* — Dung H Bui
(74) *Attorney, Agent, or Firm* — Chun-Ming Shih

(57) ABSTRACT

A water-vapor separation box for an instant-hot type water dispenser comprises: a box body, including: a water input tube, disposed on a side wall at an upper end of the box body; a first block plate, disposed on a rear side of a water output end of the water input tube; a second block plate, disposed at a rear side of the first block plate, to make the vapor flow upward; a water output tube, disposed at a rear side of the first block plate to directly flow the water out; a vapor output tube, disposed around outer perimeter of the water output tube, with vapor input elevation of the vapor output tube higher than the water input elevation of the water output tube; and a box cover, disposed over an upper opening of the box body.

2 Claims, 2 Drawing Sheets

(56) References Cited

U.S. PATENT DOCUMENTS

| | | | | |
|---|---|---|---|---|
| 5,840,104 A * | 11/1998 | Hashimoto | B01D 53/0446 | 123/519 |
| 5,912,368 A * | 6/1999 | Satarino | B01D 45/08 | 55/320 |
| 6,475,382 B2 * | 11/2002 | Parent | C02F 3/102 | 210/198.1 |
| 6,500,338 B2 * | 12/2002 | Baah | B01D 15/00 | 210/266 |
| 7,182,874 B2 * | 2/2007 | Allard | C02F 1/38 | 210/170.03 |
| 7,481,321 B2 * | 1/2009 | Ismert | B01D 21/0003 | 210/519 |
| 8,329,033 B2 * | 12/2012 | Klein | F02M 37/221 | 210/252 |
| 2009/0166286 A1 * | 7/2009 | Volchko | F02D 33/003 | 210/455 |
| 2015/0144091 A1 * | 5/2015 | Erdmann | F02F 7/006 | 123/193.3 |
| 2016/0016824 A1 * | 1/2016 | Dawes | C02F 1/40 | 210/801 |

* cited by examiner

WATER-VAPOR SEPARATION BOX FOR INSTANT-HOT TYPE WATER DISPENSER

BACKGROUND OF THE INVENTION

Field of the Invention

The present invention relates to a water-vapor separation box, and in particular to a water-vapor separation box for an instant-hot type water dispenser.

The Prior Arts

Presently on the market, the water-vapor separation structure can be categorized into two types. For the first type, the water-vapor separation box is separated from the water output end, while the water-vapor separation box is provided with vapor exhaust pipe, such that vapor is processed and then transported to the water output end. For the second type, the water-vapor separation box and the water output end are formed integrally into a body, while the vapor exhaust pipe is provided on its top or its side. Both types of water-vapor separation structures are provided with vapor exhaust pipes to exhaust or recover vapor, yet both have the disadvantages that the connection of the pipes are complicated, and their connection joints are liable to have leakage.

Therefore, presently, the design and performance of water-vapor separation structure is not quite satisfactory, and it leaves much room for improvement.

SUMMARY OF THE INVENTION

In view of the problems and drawbacks of the prior art, the present invention provides a water-vapor separation box for an instant-hot type water dispenser, to effectively overcome the shortcomings of the prior art.

A major objective of the present invention is to provide a water-vapor separation box for an instant-hot type water dispenser, comprising: a box body, and a box cover. The box body includes a water input tube, a first block plate, a second block plate, a water output tube, and a vapor output tube. Wherein, the water input tube is disposed on a side wall at an upper end of the box body; the first block plate is disposed on a rear side of a water output end of the water input tube, to make water and vapor flow to a low end of the box body; the second block plate is disposed at the rear side of the first block plate, and at the lower end of the box body, to make the vapor flow upward; the water output tube is disposed at a rear side of the first block plate, and at the lower end of the box body, to directly flow the water out; the vapor output tube is disposed around the outer perimeter of the water output tube to output vapor, and is separate from the water output tube, with vapor input elevation of the vapor output tube higher than the water input elevation of the water output tube. And a box cover is disposed over an upper opening of the box body.

In an aspect of the present invention, the first block plate is disposed below the box cover.

In another aspect of the present invention, in the box body is provided with a room temperature water input tube, and a hot water input tube.

The advantage of the present invention over the Prior Art can be summarized as follows: 1. the vapor is output directly from the vapor output tube, to eliminate the vapor exhaust pipe line, so as to simplify the structure of the pipe line. 2. Room temperature water are separated from hot water, to redress the problem of water over-heating as a result of first fetching hot water from the instant-hot type water dispenser then fetching room temperature water from the water dispenser.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
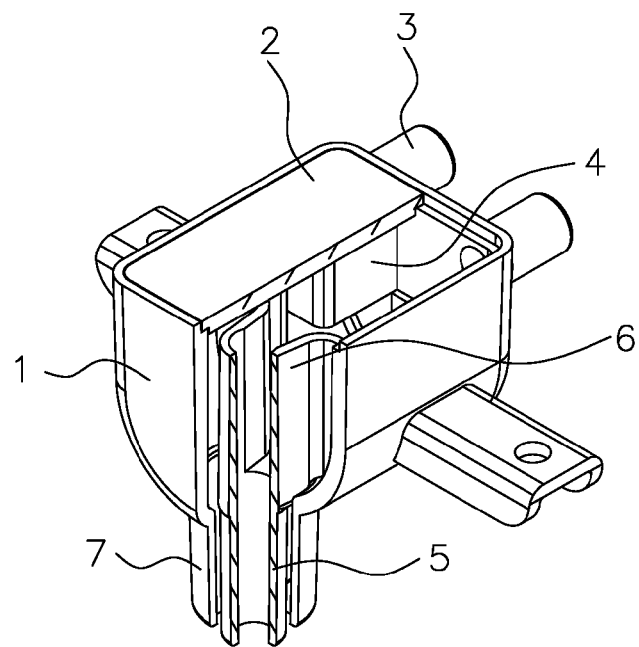
FIG. 1 is a schematic diagram of a water-vapor separation box for an instant-hot type water dispenser according to the present invention.
Figure 2:
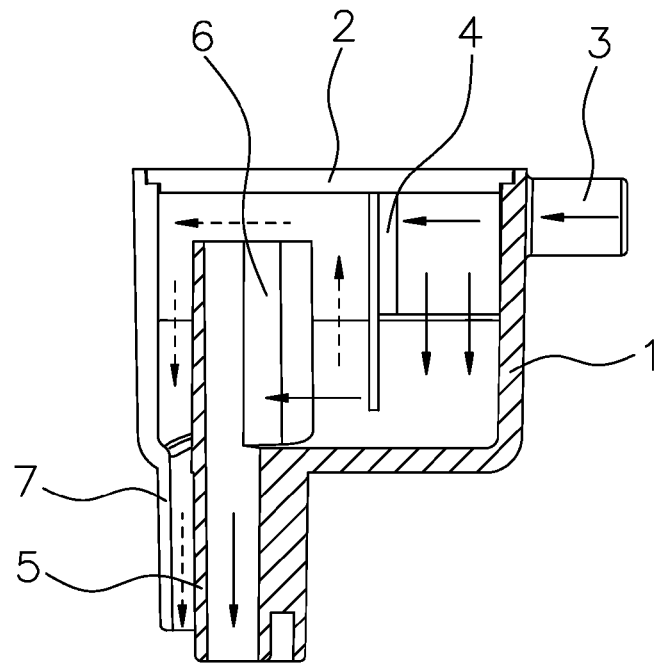
FIG. 2 is a cross section view of a water-vapor separation box for an instant-hot type water dispenser according to the present invention.
Figure 3:
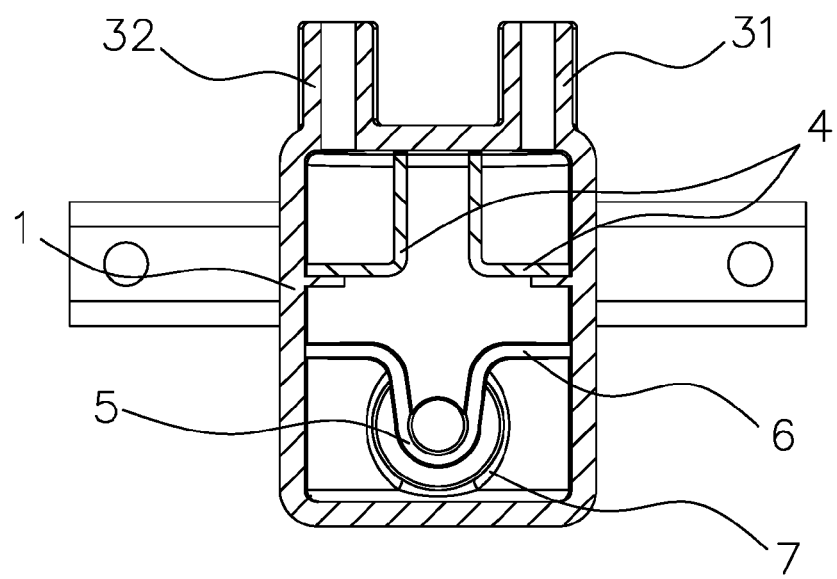
FIG. 3 is a schematic diagram of a water-vapor separation box for an instant-hot type water dispenser according to an embodiment of the present invention.
Figure 4:
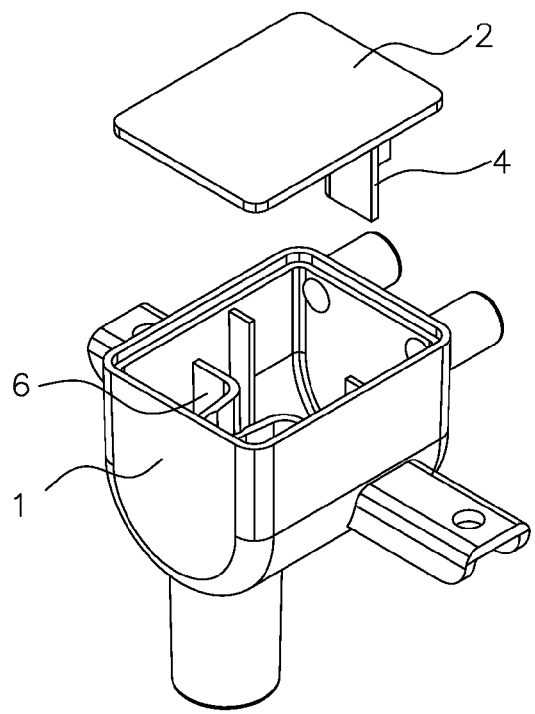
FIG. 4 is an exploded view of a water-vapor separation box for an instant-hot type water dispenser according to the present invention.

Refer to FIGS. 1 to 4 respectively for a schematic diagram of a water-vapor separation box for an instant-hot type water dispenser according to the present invention; a cross section view of a water-vapor separation box for an instant-hot type water dispenser according to the present invention; a schematic diagram of a water-vapor separation box for an instant-hot type water dispenser according to an embodiment of the present invention; and an exploded view of a water-vapor separation box for an instant-hot type water dispenser according to the present invention.

As shown in FIGS. 1 to 4, the present invention provides a water-vapor separation box for an instant-hot type water dispenser, comprising: a box body 1, and a box cover 2. The box body 1 includes a water input tube 3, a first block plate 4, a second block plate 6, a water output tube 5, and a vapor output tube 7. Wherein, the water input tube 3 is disposed on a side wall at an upper end of the box body 1; the first block plate 4 is disposed on a rear side of a water output end of the water input tube 3, to make water and vapor flow to a low end of the box body 1; the second block plate 6 is disposed at a rear side of the first block plate 4, and at the lower end of the box body 1, to make the vapor flow upward; the water output tube 5 is disposed at a rear side of the first block plate 4, and at the lower end of the box body 1, to directly flow the water out; the vapor output tube 7 is disposed around outer perimeter of the water output tube 5 to output vapor, and is separate from the water output tube 5, with the vapor input elevation of the vapor output tube 7 higher than the water input elevation of the water output tube 5. And the box cover 2 is disposed over an upper opening of the box body 1.

In an aspect of the present invention, the first block plate 4 is disposed below the box cover 2.

In another aspect of the present invention, in the box body 1 is provided with a room temperature water input tube 31, and a hot water input tube 32, a water output tube, and a vapor output tube. The characteristics of such a structure are that, firstly, a water block plate is disposed respectively at the rear side of two water input tube water output ends. Secondly, the water output tube is derived from and is an offshoot of the vapor output tube, such that water and vapor are separated from each other. Since the vapor output port is higher than the water output port, such that water is output at a lower position, while vapor is output at a higher position.

In the process of outputting hot water, since vapor is lighter than water, such that vapor is floated on water. As such, when the pipe line of the water output tube at a lower position is fully occupied with hot water, and when the pressure in the water-vapor separation box reaches saturation balance, vapor can only be output from the vapor output tube at a higher position.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A water-vapor separation box for an instant-hot type water dispenser, comprising:
   a box body, including:
   a water input tube, disposed on a side wall at an upper end of the box body;
   a first block plate, disposed on a rear side of a water output end of the water input tube, to make water and vapor flow to a low end of the box body;
   a second block plate, disposed at the rear side of the first block plate, and at the lower end of the box body, to make the vapor flow upward;
   a water output tube, disposed at a rear side of the first block plate, and at the lower end of the box body, to directly flow the water out;
   a vapor output tube, disposed around outer perimeter of the water output tube to output vapor, and is separate from the water output tube, with vapor input elevation of the vapor output tube higher than the water input elevation of the water output tube; and
   a box cover, disposed over an upper opening of the box body; wherein the first block plate is disposed below the box cover.

2. The water-vapor separation box for an instant-hot type water dispenser as claimed in claim 1, wherein in the box body is provided with a room temperature water input tube, and a hot water input tube.

* * * * *